United States Patent
Tucker

(10) Patent No.: US 6,223,204 B1
(45) Date of Patent: *Apr. 24, 2001

(54) USER LEVEL ADAPTIVE THREAD BLOCKING

(75) Inventor: Andrew G. Tucker, Los Altos, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/767,353

(22) Filed: Dec. 18, 1996

Related U.S. Application Data

(63) Continuation of application No. 08/767,353, filed on Dec. 18, 1996.

(51) Int. Cl.⁷ ........................................................ G06F 9/00
(52) U.S. Cl. .......................... 709/103; 709/100; 710/200
(58) Field of Search ..................................... 395/733, 704, 395/551, 650, 477; 795/704; 713/200; 710/200, 5, 260; 709/103, 100, 101, 102, 104, 105, 107, 108

(56) References Cited

U.S. PATENT DOCUMENTS

| 5,452,452 | * | 9/1995 | Gaetner et al. | 395/650 |
| 5,515,538 | * | 5/1996 | Kleiman | 395/733 |
| 5,524,247 | * | 6/1996 | Mizuno | 710/200 |
| 5,542,088 | * | 7/1996 | Jennings, Jr. et al. | 709/103 |
| 5,590,326 | * | 12/1996 | Manabe | 395/477 |

(List continued on next page.)

OTHER PUBLICATIONS

Powell, Kleiman, Barton, Shah, Stein, Weeks, "SunOS Multi–Thread Architecture", USENIX –Dallas, TX, Sun Microsystems Inc., Win '91.*

D. Stein, D. Shah, "Implementing Lightweight Threads", USENIX, San Antonio, TX, Sunsoft Inc., Sum '92.*

Kleiman, Voll, Eykholt, Shivalingiah, Williams, Smith, Barton, Skinner, "Symmetric Multiprocessing in Solaris 2.0", Sunsoft Inc., Mountain View, California.*

Eric C. Cooper and Richard P. Draves, "C Threads", Department of Computer Science, Carnegie Mellon University, Sep. 11, 1990.*

David L. Black, Scheduling for Concurrency and Parallelism in the Mach Operating System, School of Computer Science, Carnegie Mellon University.*

(List continued on next page.)

Primary Examiner—Majid A. Banankhah
(74) Attorney, Agent, or Firm—Beyer Weaver & Thomas, LLP

(57) ABSTRACT

A computer apparatus with user and kernel level memory regions schedules multiple light weight processes to run on one or more data processors. A mutex protects data in memory and permits only one thread to access the data at a time. Data pertaining to the running status of each of the light weight processes is stored in one or more kernel data structures which are mapped to the user level. When a thread attempts to acquire a mutex held by another thread, then the kernel data structure is checked to determine the status of the light weight process and its associated thread. The thread attempting to acquire the mutex is caused to sleep or spin according to the current running or not running status of the light weight process. If the light weight process holding a mutex is running, then the thread attempting to acquire the mutex will spin. If the light weight process then holding a mutex is stopped, then the thread attempting to acquire the mutex will block or sleep until awakened.

10 Claims, 5 Drawing Sheets

U.S. PATENT DOCUMENTS 5,815,689 * 9/1998 Shaw et al. ............................ 395/551
5,822,588 * 10/1998 Sterling et al. ....................... 395/704

OTHER PUBLICATIONS

"Solaris Network Operating Environment", Solaris —Networked Computing for the Global Entreprise, Nov. 1995.*

Randall W. Dean, "Using Continuations to Build a User-Level Threads Library", School of Computer Science, Carnegie Mellon University.*

Richard P. Draves, Brian N. Bershad, Richard F. Rashid and Randall W. Dean, "Using Continuations to Implement Thread Management and Communication for Operating Systems", School of Computer Science, Carnegie Mellon University.*

Govindan et al., "Scheduling and IPC Mechanisms for Continuous Data"–ACM, 1991.*

* cited by examiner

USER LEVEL ADAPTIVE THREAD BLOCKING

This is a continuing prosecution application to U.S. patent application Ser. No. 08/767,353, filed Dec. 18, 1996.

TECHNICAL FIELD

The present invention relates to computer systems, and more particularly relates to improved methods, apparatuses, and computer program products for allocating resources in multithreading computing environments.

BACKGROUND OF THE INVENTION

FIG. 1 is a diagram of a conventional multithreaded computer memory 2 connected to first and second data processors 3 particularly identified as first and second processors 3a and 3b. Multithreaded computer operations can however be implemented with a single data processor as well. Multithreaded computer systems are disclosed in U.S. Pat. No. 5,515,538, "Apparatus and Method for Interrupt Handling in a Multi-threaded Operating System Kernel," granted in 1996 to inventor Steven R. Kleiman and assigned to Sun Microsystems, Inc., of Mountain View, Calif. That patent is hereby expressly incorporated hereinto and made a part of the present application. computer memory 2 includes a user level memory region 2a and a kernel level memory region 2b. A multithreaded computer memory is a computer memory on which multiple threads are being executed. A thread is an independent program code execution sequence. User level memory region 2a is shown possessed by a plurality of threads 5 including thread 5a through thread 5f, a threads library 8, a data element 9, and a mutex (i.e., mutual exclusion) lock 9a. Kernel level memory region 2b is shown possessed by a plurality of light weight process 12 and a run queue 14. Data element 9 is code or information required for processing by a particular thread. The plurality of light weight processes 12 includes light weight processes 12a–12d. Threads library 8 is a mechanism for scheduling individual ones of threads 5 onto particular ones of light weight processes ("LWPs"). A scheduled thread blocks other threads from running on an associated LWP until the scheduled thread has completed running through its execution sequence. For details regarding threads and light weight processes, see for example *Programming with UNIX Threads* by Charles J. Northrup (John Wiley & Sons, Inc., 1976), pp. 4–6. Briefly, light weight processes are kernel entities which are scheduled to run entirely within a kernel level memory region 2b. Threads 5 are scheduled at user level memory 2a onto LWPs 12. Particular LWPs 12 are in turn scheduled onto particular ones of processors 3. Run queue 14 contains information for scheduling LWPs 12 onto multiple processors 3a and 3b. For example, of six threads 5a–5f which FIG. 1 shows, only four threads 5c–5f are shown scheduled onto corresponding four LWPs 12a–12d. Further, of four LWPs 12a–12d, only two LWPs 12c–12d are scheduled onto respective processors, 3a and 3b. User level memory 2a further includes a multiple exclusion lock (i.e., mutex) 9a associated with data element 9. Thread 5f of user level memory 2a is shown connected by line 9a' to mutex lock 9a to represent that thread 5f owns mutex lock 9a momentarily and that no other thread can access data element 9 while the owning thread runs. Line 9a' suggests that the execution sequence of thread 5f is dependent on data element 9 which is protected by mutex lock 9a.

Unfortunately, the run status of light weight processes is not available within user level memory region 2a. This presents a technical problem which is desirably overcome. Accordingly, when a thread which has been scheduled onto a particular LWP seeks to acquire a particular lock and access to data associated with the particular lock, the thread waits for the associated light weight process to complete executing its current scheduled process whether the current light weight process is already running or whether it shows no indication of running in the future. Priority inversion of threads thus results when the scheduled threads are spinning for excessive periods of time waiting for a prior light weight process to complete execution. Such waiting may block timely scheduling of higher priority threads.

SUMMARY OF THE INVENTION

According to the present invention, a computer apparatus includes cooperative user level and operating system level memory regions, in which threads in the user level memory region are scheduled onto light weight processes in the operating system level memory region according to light weight process run states. The computer apparatus, according to the present invention, includes at least a single data processor which runs light weight processes in accordance with the present invention. The threads are scheduled onto the light weight processes by a threads library which receives information from an operating system data structure containing the run states of the light weight processes. According to one embodiment of the present invention, the operating system level memory region includes a data structure containing light weight process run state conditions which are provided to the user level memory region for use by the threads library in scheduling threads onto light weight processes. If a thread is scheduled onto a non-running light weight process, the thread is blocked, in accordance with the present invention, and the thread goes to sleep. This is advantageous particularly for high priority threads which consume substantial processing resources in a spin state, because if such a high priority light weight process is put to sleep, processing resources can be applied to low priority processes which have applied a lock on certain data. This allows the low priority light weight process to reach process completion rather than being preempted in terms of processing time by higher priority processes. Such preemption impedes completion of processing of low priority processes. Further, according to the present invention, light weight process states are mapped onto user level memory regions to permit threads to spin when a target light weight process is running, but to sleep (e.g., block) when a target light weight process is not running. According to the present invention, a computer program product provides code which stores the run status of at least a single light weight process, and code which makes run status information of light weight processes accessible by user level memory. According to the present invention, acquiring threads spin in a busy waiting loop if scheduled onto running light weight processes. However, if a particular lock on thread required code or data however is not expected to become available soon (as indicated by a non-running light weight process), a thread seeking to be scheduled onto a light weight process is instead directed to go to sleep and to wait to be awakened at a time when the lock opens and the sought data becomes available. When the acquiring thread sleeps it is said to "block". When a thread sleeps, the processor which is running the light weight process associated with the thread is able to accomplish other tasks, until the lock becomes unavailable. The lock is adaptive, because the lock's scheduling state and the run status of the owning thread determines whether the new thread will spin or sleep/block. In particular, according to the present invention, if a lock owning a particular thread and a particular data element is currently running, other threads trying to acquire the lock will keep on trying to acquire the lock, since it is assumed the lock will become available soon because it is already running. On the other hand, if the lock owner and thread are not running, other threads trying to acquire the lock will go to sleep, since in that non-running condition the lock is unlikely to become available soon.

DESCRIPTION OF THE PREFERRED EMBODIMENT

Figure 1:
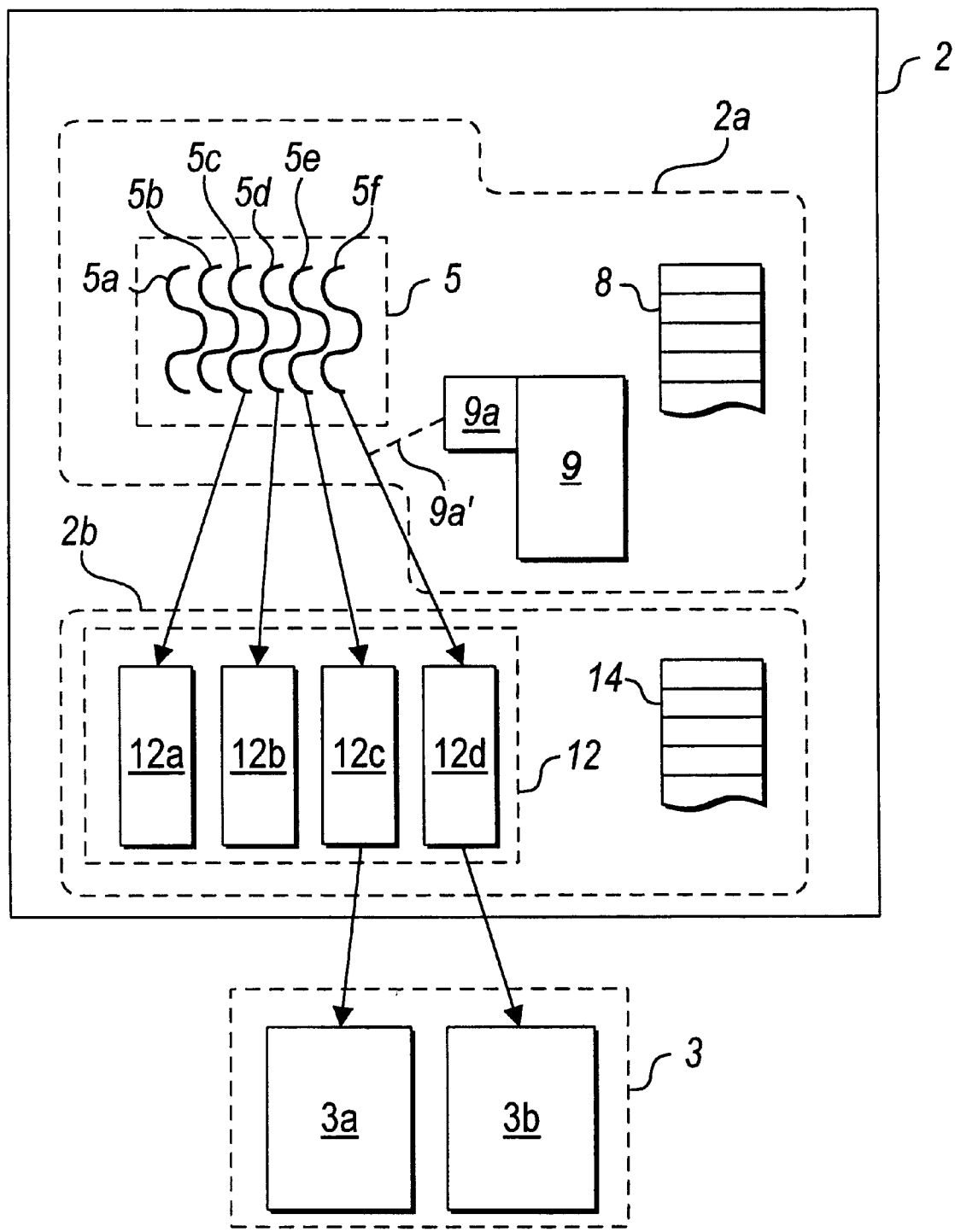
FIG. 1 is a diagram of a user level and kernel level memory region allocation, according to the prior art.
Figure 2:
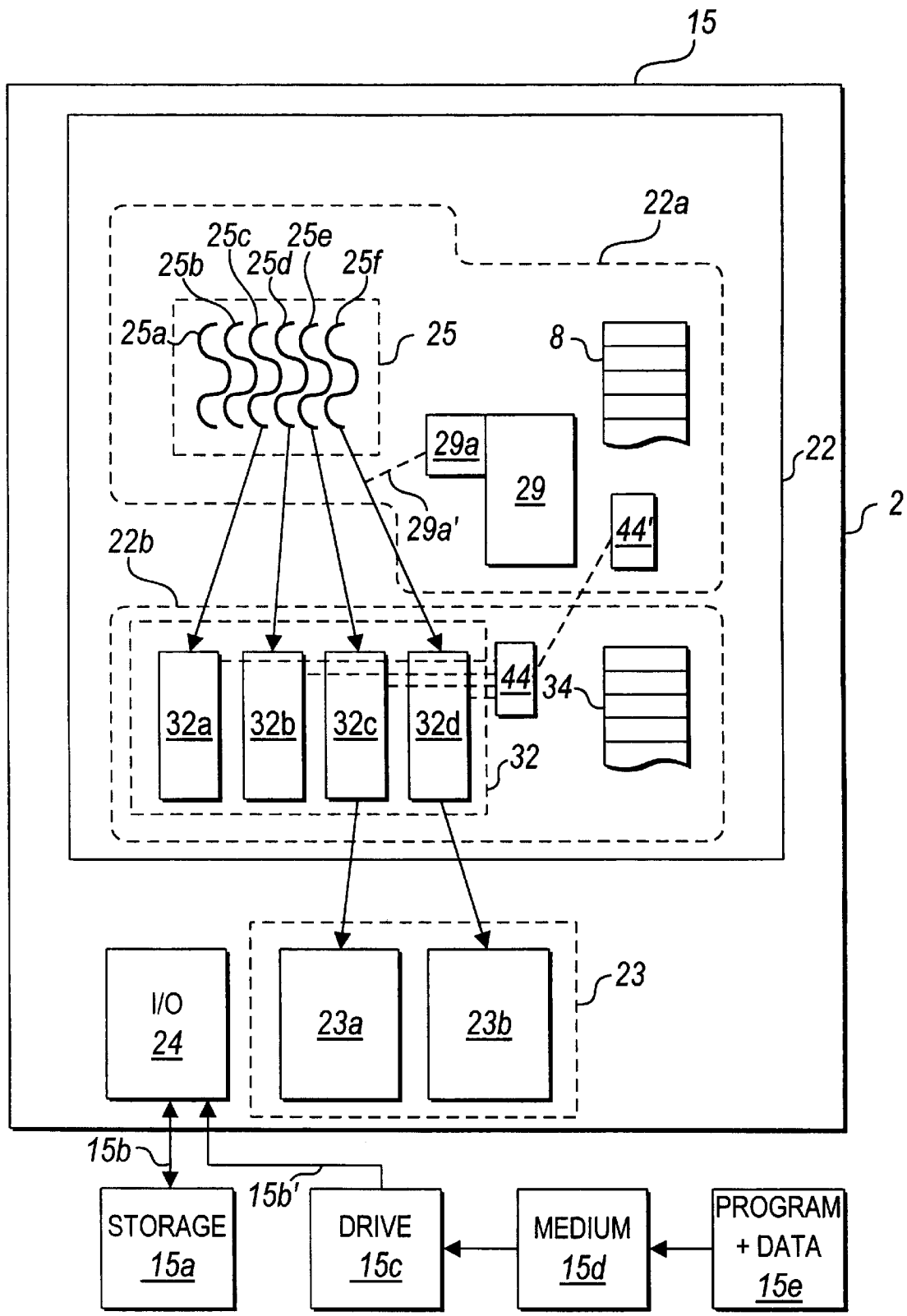
FIG. 2 is a block diagram of a computer system implementing mutex adaptive locking in accordance with the present invention.

FIG. 2 shows a computer system 15 according the present invention connected to an external storage device 15a and to an external drive 15c through which computer program products according to the present invention can be loaded into computer system 15. External storage device 15a and external drive 15c are connected to computer system 15 through respective bus lines 15b and 15b'. Computer system 15 includes a memory 22, processors 23 including first and second processors 23a and 23b, and an input output section 24 for connection with external storage 15a and drive 15c. Drive 15c can read selected media 15d containing program code and data 15e serving as a computer program product according to the present invention. Media 15d can be a magnetic or optical medium which can be read by drive 15c. Drive 15c can be a computer program product reader such as a floppy disk drive, an optical drive, or a CD-ROM drive. FIG. 2 additionally shows memory 2 including a user level memory region 23a and a kernel level memory region 22b. Memory 2 can be virtual memory which is mapped onto physical memory including RAM or a hard drive, for example without limitation. During process execution, user level memory region 22a includes a plurality of threads 25, a threads library 28, a data element 29, a mutex lock 29 associated with data element 29, and a user data structure 44'. According to the present invention, kernel level memory region 22b includes a plurality of light weight processes 32, a run queue 34, and kernel data structure 44 associated with user data structure 44'. User data structure 44' represents the virtual availability of kernel data structure information in user level memory region. Kernel data structure 44 contains the states of each corresponding light weight process (LWP) 32 as suggested by dashed lines between each LWP 32 and kernel data structure 44. Information from kernel data structure 44 is mapped onto user level memory region 2a according to the present invention and made available to threads library 28 for scheduling spinning and blocking threads 25, according to the present invention.

Figure 3:
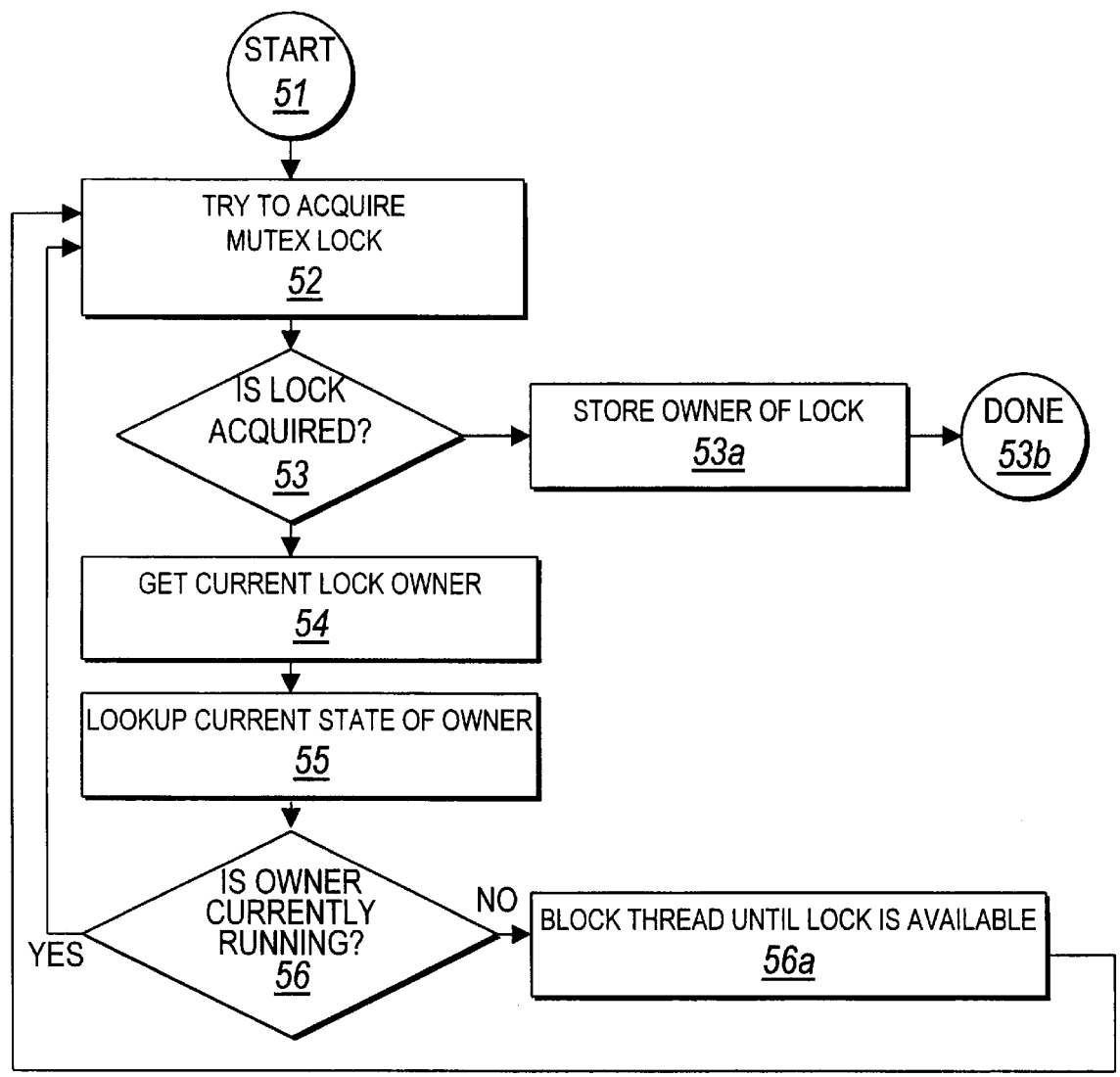
FIG. 3 is a flow diagram of a method according to the present invention.

FIG. 3 shows a method 50 according to the present invention. The method according to the present invention starts 51 when a thread attempts 52 to acquire a mutex lock. If the lock is acquired 53, information identifying the thread owning the lock is stored 53a and processing of lock acquisition is completed 53b. If the lock is not acquired (e.g., the lock is held by a prior schedule thread), the thread owning the particular mutex lock is identified 54, and the current state of the owning thread is determined 55. The potential states of a LWP include running, runnable but not running, sleeping, or stopped. If the particular LWP is running, another attempt is made to acquire the mutex lock by repeating steps 52–56. The repeated cycle of steps 52–56 is called "spinning." If the particular LWP is not currently running, then the thread attempting to acquire the mutex 18 is put to sleep (i.e., is "blocked") until separately awakened.

Figure 4A:
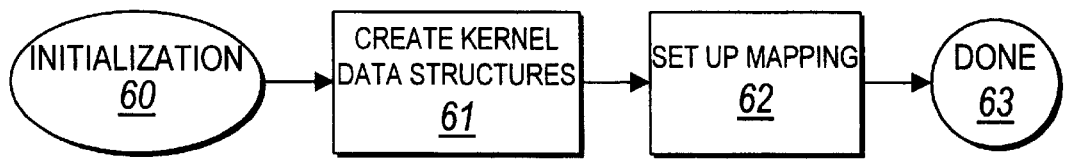
FIG. 4A is a flow diagram of a kernel initialization process according to the present invention.

FIGS. 4A–4F illustrate respective kernel processes in accordance with the present invention. In particular, FIG. 4A shows a kernel data structure initialization process 60 according to the present invention. In particular, at initialization a kernel data structure is created 61 which holds data on the running or not running status of selected inbound light weight processes. Further at initialization, a mapping is conducted 62 to make available information from the kernel data structures which have been created, at the user level. The mapping establishes a virtual user level data structure 44', corresponding to kernel level data structure 44'. This completes initialization 63.

Figure 4B:
FIG. 4B is a flow diagram of a kernel preemption process according to the present invention.

FIG. 4B shows a kernel preemption process 70 according to the present invention. According to kernel preemption process 70, information in kernel data structure 44 on the status of a light weight process is altered to store a new process state 71. Thus, when the kernel data structure 44 is read, an altered LWP status is expressed. After completion of storage of the new process state in the kernel data structure, the kernel preemption process is done 72.

Figure 4C:
FIG. 4C is a flow diagram of a kernel scheduling process according to the present invention.

FIG. 4C shows a kernel scheduling process 80 according to the present invention. According to kernel scheduling process 80, a new process state is stored 81 in a kernel data structure 44. After completion of storage of the new process state in the kernel data structure, the kernel scheduling process is done 82.

Figure 4D:
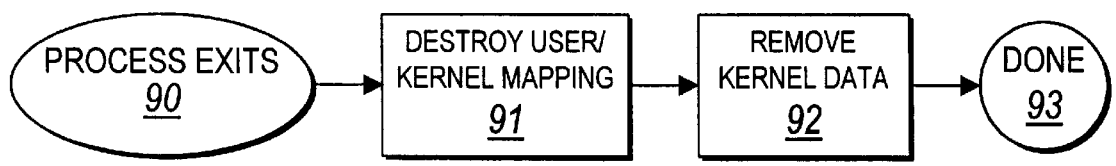
FIG. 4D is a flow diagram of a process exit method according to the present invention.

FIG. 4D shows a process exit operation 90 according to the present invention. According to process exit operation 90, previously established kernel to user mapping providing user level information as to the run or not run status of particular light weight processes, is destroyed 91. Additionally, according to process exit operation 90, the kernel data structure containing information on the status of LWPs is removed 92. After completion of removal of the kernel data structure, the process exit operation is done 93.

Figure 4E:
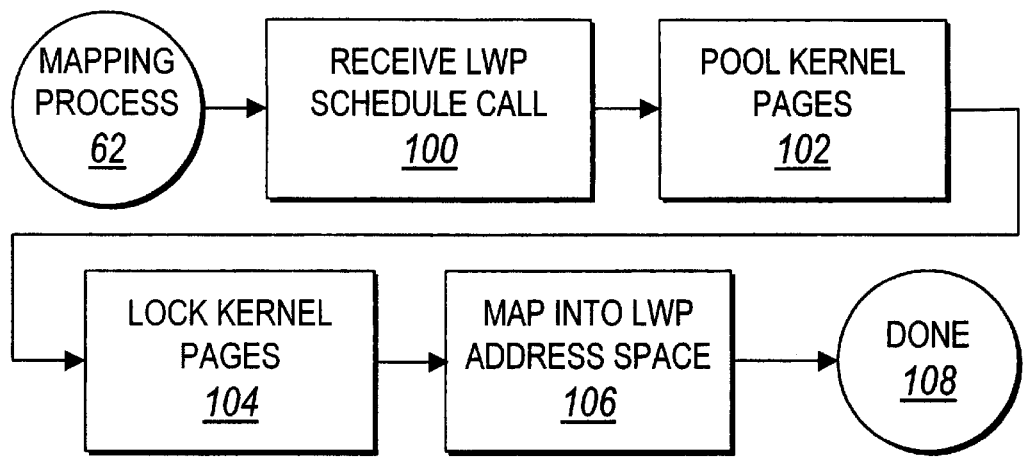
FIG. 4E is a flow diagram of a mapping process according to the present invention.

FIG. 4E shows a mapping process 62 according to the present invention. A light weight process (LWP) call is received 100. Kernel pages are pooled 102 and are locked 104 into physical memory. The kernel pages are mapped 106 into the light weight process address space. The kernel may update information about an LWP 32 by storing at least one shared page without faulting because the page is locked. At the user level the information may be received by loading the appropriate location in the mapped page. Likewise, information can be stored at the user level and loaded by the kernel. After the mapping into the LWP address space is completed, the mapping process 62 is completed 108.

Figure 4F:
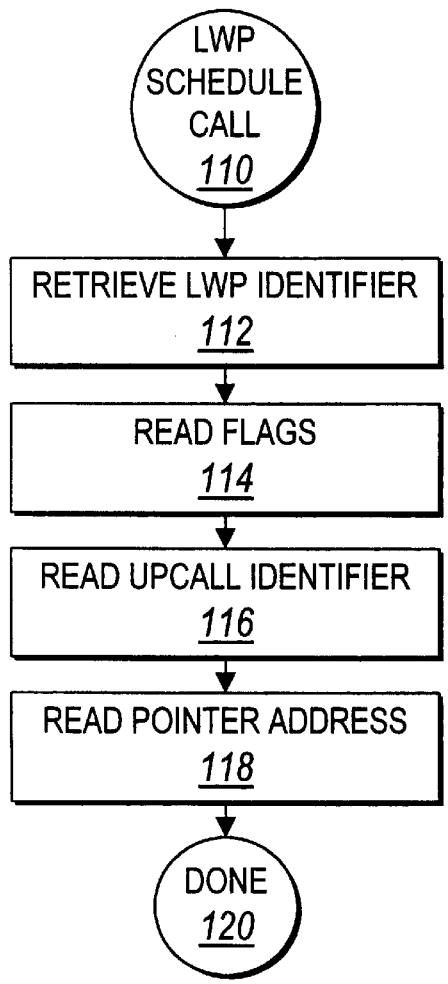
FIG. 4F is a flow diagram of a light weight process schedule call according to the present invention.

FIG. 4F is a flow diagram of the LWP scheduled call process according to the present invention. An LWP identifier is retrieved 112. The LWP identifier indicates the effected LWP 32. In one embodiment, one LWP 32 may set or change the scheduling of another LWP 32. In one embodiment, such changing may occur within the same process. The flags are read 114. In one embodiment, one flag is a state flag. The state flag allows the computer system 15 to perform adaptive mutexes and thread affinity scheduling. If the state flag is set, the kernel maintains data indicating whether the LWP 32 is currently running on a processor 23, and on which processor 23 the LWP 32 is running or last ran. In one embodiment, such data is continually copied into a location of user memory accessible whenever the LWP 32 blocks, or is preempted or scheduled. Such copying may be used to implement adaptive mutexes. In one embodiment, a flag includes a preempt flag. The preempt flag provides a means to shield LWPs from preemption for short periods of time. If the preempt flag is set, the kernel avoids preempting the LWP 32 when it is indicated via shared data that the LWP 32 should not be preempted. If the preemption is blocked, the LWP 32 yields the next time the LWP 32 can yield appropriately. An LWP 32 that fails to yield when requested will have a reduced priority. The preempt flag is used by the threads library 28 for preemption control. In one embodiment, a flag includes a block flag. The block flag provides an efficient way of recovering from blocking. If the block flag is set, the kernel may perform an upcall routine when the LWP blocks. An upcall routine involves switching directly to another LWP 32 in the process. In one embodiment, a flag includes a priority flag. The priority flag allows the computer system 15 to perform real thread priority scheduling. If the priority flag is set, the kernel performs the necessary actions to maintain proper priority semantics in the process based on the data supplied by the threads library 28. In one embodiment, this may be implemented by an LWP 32 running a low priority thread from a processor 23 if a processor running a high priority thread is preempted. In one embodiment, the threads library 28 sets the priority flag when a thread of non-default priority is scheduled.

An upcall identifier is read 116. As described above, a block flag may cause the kernel to perform an upcall. The upcall identifier is a file descriptor of the entry point to begin running in the new LWP. In an embodiment with the threads 28, the entry point may be idle loop of the library. Upon entry, the new LWP 32 looks for threads to begin executing.

A pointer address is read 118. The pointer is where the kernel stores the location of a buffer that is shared between the application and the kernel upon successful completion of a system call. Such a buffer may be used for bidirectional communications of scheduling information about the corresponding LWP 32.

The LWP schedule call allocates data for an LWP 32 and the page corresponding to its effective identification and automatically maps the page into the user address space. The LWP schedule call also tracks the mappings for each process and avoids mapping the same page twice into the same address space. After processing the address pointer, the LWP schedule call is completed 120.

In summary, when a thread attempts to acquire a mutex lock, the run status of the LWP holding the mutex lock is checked. The acquiring thread will then either spin or block, depending on whether the particular light weight process is running or not. In particular, if the LWP is running, the acquiring thread will spin, because the expectation is that a running LWP will get its process completed in short order. However, if the acquiring thread finds the targetted LWP is not running, the thread is blocked and goes to sleep, saving the applicable processor from having to spin.

The present invention may be implemented with a conventional general purpose digital computer programmed according to the teachings of the present specification. Appropriate software coding can be readily prepared by programmers of ordinary skill based on the present disclosure. Additionally, according to the present invention, a computer program product includes code which can be used to program a computer to cause acquiring threads to spin or sleep depending upon the run status of light weight processes locking needed data. Storage media for computer program products according to the present invention can include, but are not limited to, floppy disks, optical disks, CD-ROMs, and magneto-optical disks, as read only memories (ROMs), random access memories (RAMs), electrically programmable read only memories (EPROMs), magnetic cards, optical cards, and other types of media suitable for storing electronic instructions or code.

The above shows only some of the examples of available embodiments of the present invention. Those skilled in the art will understand that numerous other modifications and alterations may be made without departing from the spirit and scope of the invention. Accordingly, the above disclosure is not intended as limiting, and the appended claims are to be interpreted as encompassing the entire scope of the invention in its full breadth.

According to the present invention, data is shared between user and kernel levels to show the activity status of the locks associated with particular threads. In particular, kernel level lock and thread activity status information is made available at the user level. The present inventive method can be implemented in SPARC architectures designed by Sun Microsystems, Inc. of Mountain View, Calif. The present inventive method is further capable of being practiced with Intel X86 and Power PC™ computer architectures.

What is claimed is:

1. A computer apparatus comprising:

a computer system, including a memory configured to include a user level memory region and an operating system level memory region;

a plurality of threads configured to operate in the user level memory region;

a plurality of light weight processes configured to operate in the operating system level memory region to run selected threads from the plurality of threads;

at least one data process for running the plurality of light weight processes;

a kernel data structure in the operating system level memory region that includes selected information on each thread that is presently running at least one light weight process;

a user data structure in the user level memory region, configured to receive information from the kernel data structure;

a mapping mechanism for mapping information from the kernel data structure into the user data structure;

a scheduling mechanism for associating at least one thread to run at least one of the plurality of light weight processes or a selected high priority process, based on the mapped information received by the user data structure, wherein the at least one thread is caused to enter a spin state when scheduled onto a light weight process that is running;

a light weight process status indicator that indicates status of at least one of the plurality of light weight processes, configured to be read by the scheduling mechanism for thread scheduling, wherein the at least one thread is caused to enter a sleep state when the at least one light weight process is in a non-running state;

wherein the scheduling mechanism is configured to distinguish between the selected high priority process and the at least one light weight process, to block the selected high priority process, to place the selected high priority process in a sleep state, and to allow the at least one light weight process to complete a process begun by the at least one light weight process.

2. The apparatus of claim 1, wherein said scheduling mechanism is configured to read said light weight process status indicator to determine a scheduling status for said at least one thread.

3. The apparatus of claim 1, wherein at least one of said user level memory region and said operating system level memory region implements a mutually exclusive lock on selected memory region code.

4. The apparatus of claim 1, wherein said light weight process status indicator indicates whether a selected thread is running.

5. The apparatus of claim 1, wherein said scheduling mechanism is configured to cause said at least one thread to block when said light weight process status indicator indicates that said at least one light weight process is not running.

6. A method for scheduling a thread onto a light weight process in a computer system, the method comprising:

storing run status of at least one light weight process in an operating system level memory and in a user level memory;

receiving a request for acquisition of a mutually exclusive ("mutex") lock from a selected thread;

determining if the mutex lock is already acquired;

when the mutex lock is already acquired, identifying a light weight process that has acquired the mutex lock and determining run status of the identified light weight process;

when the identified light weight process is determined to be running, causing the selected thread to enter a spin state until completion of the process by the identified light weight process; and when the identified light weight process is determined not to be running, causing the selected thread to enter a sleep state until the light weight process begins running.

7. The method of claim 6, further comprising:

when said mutex lock is not already acquired, allowing said selected thread to acquire said mutex lock.

8. The method of claim 6, further comprising:

distinguishing between said identified light weight process and at least one high priority process;

determining if the at least one high priority process is running; and when the at least one high priority process is determined not to be running, causing the high priority process to enter a sleep state.

9. The method of claim 6, further comprising storing run status of said identified light weight process in a selected data structure of said operating system level memory that is not directly user accessible.

10. The method of claim 6, further comprising storing run status of said identified light weight process in a selected data structure of said operating system level memory that is user accessible.

* * * * *